(12) United States Patent
Ikehata et al.

(10) Patent No.: US 9,416,036 B2
(45) Date of Patent: Aug. 16, 2016

(54) METHOD FOR TREATING CONTAMINATED WATER

(75) Inventors: Keisuke Ikehata, Fountain Valley, CA (US); Andrew T. Komor, Irvine, CA (US)

(73) Assignee: Pacific Advanced Civil Engineering, Inc., Fountain Valley, CA (US)

( * ) Notice: Subject to any disclaimer, the term of this patent is extended or adjusted under 35 U.S.C. 154(b) by 585 days.

(21) Appl. No.: 13/342,891

(22) Filed: Jan. 3, 2012

(65) Prior Publication Data

US 2012/0175301 A1    Jul. 12, 2012

Related U.S. Application Data

(60) Provisional application No. 61/430,034, filed on Jan. 5, 2011.

(51) Int. Cl.

| | |
|---|---|
| *C02F 3/32* | (2006.01) |
| *C02F 3/22* | (2006.01) |
| *C02F 3/02* | (2006.01) |
| *C02F 1/04* | (2006.01) |
| *C02F 1/44* | (2006.01) |
| *C02F 101/10* | (2006.01) |
| *C02F 101/20* | (2006.01) |

(Continued)

(52) U.S. Cl.
CPC ... *C02F 3/22* (2013.01); *C02F 3/02* (2013.01); *C02F 1/04* (2013.01); *C02F 1/441* (2013.01); *C02F 1/445* (2013.01); *C02F 2101/10* (2013.01); *C02F 2101/103* (2013.01); *C02F 2101/20* (2013.01); *C02F 2103/001* (2013.01); *C02F 2103/06* (2013.01); *C02F 2103/08* (2013.01); *C02F 2209/02* (2013.01); *C02F 2209/06* (2013.01); *C02F 2303/20* (2013.01); *C02F 2305/06* (2013.01); *Y02W 10/15* (2015.05); *Y02W 10/37* (2015.05)

(58) Field of Classification Search
CPC ............. C02F 2103/08; C02F 2101/20; C02F 2103/06; C02F 2101/10; C02F 2303/20; C02F 2305/06; C02F 2209/06; C02F 2103/001; C02F 1/445; C02F 3/322; C02F 2101/103; C02F 1/04; C02F 1/441; C02F 3/02; C02F 1/602; Y02W 10/37; Y02W 10/15
USPC .................. 210/602, 610, 611, 612, 252, 259
See application file for complete search history.

(56) References Cited

U.S. PATENT DOCUMENTS

| | | | | |
|---|---|---|---|---|
| 4,044,500 | A | * | 8/1977 | Hitzman ........................ 47/1.4 |
| 4,333,263 | A | * | 6/1982 | Adey .............................. 47/1.4 |

(Continued)

FOREIGN PATENT DOCUMENTS

JP    2002-10723  A  *  1/2002

OTHER PUBLICATIONS

Goldman et al., Relative Growth of Different Species of Marine Algae in Wastewater-Seawater Mixtures, 1974, Marine Biology, vol. 28, pp. 17-25.*

(Continued)

*Primary Examiner* — Fred Prince
(74) *Attorney, Agent, or Firm* — John D. Carpenter, Esq.

(57) ABSTRACT

Provided in one embodiment is a method of treating a source water, comprising: providing a source water containing an amount of silicon-containing molecules; and exposing the source water to a plurality of organisms, whereby the amount is reduced after the exposure.

5 Claims, 7 Drawing Sheets

(51) Int. Cl.
*C02F 103/00* (2006.01)
*C02F 103/06* (2006.01)
*C02F 103/08* (2006.01)

(56) References Cited

U.S. PATENT DOCUMENTS

| | | | |
|---|---|---|---|
| 5,055,402 A | 10/1991 | Greene et al. | |
| 5,885,459 A * | 3/1999 | Lerche et al. | 210/602 |
| 7,344,644 B2 * | 3/2008 | Haudenschild | 210/617 |
| 7,718,062 B2 * | 5/2010 | Bauer et al. | 210/602 |
| 7,770,322 B2 * | 8/2010 | Huntley et al. | 47/1.4 |
| 2009/0119980 A1 * | 5/2009 | Walker | 44/308 |
| 2009/0188861 A1 * | 7/2009 | Higgin | 210/636 |
| 2011/0016773 A1 * | 1/2011 | Nichols et al. | 44/307 |
| 2011/0036775 A1 * | 2/2011 | Tarquin | 210/654 |

OTHER PUBLICATIONS

Martin-Jezequel et al., Silcon Metabolism in Diatoms: Implications for Growth, 2000, J. Phycol., vol. 26, pp. 821-840.*

Egge, J.K. and Aksnes, D.L., "Silicate as regulating nutrient in phytoplankton competition," Marine Ecology Progress Series, Jul. 16, 1992, vol. 83, pp. 281-289, Inter-Research.

Ning, R.Y., "Discussion of silica speciation, fouling, control and maximum reduction," Desalination, 2002, vol. 151, v. 67-63, Elsevier Science B.V.

Bradbury, J., "Nature's Nanotechnologists: Unveiling the Secret of Diatoms," Oct. 2004, vol. 2, Issue 10, v. 1512-1515, PLoS Biology.

* cited by examiner

METHOD FOR TREATING CONTAMINATED WATER

RELATED APPLICATION

This application claims priority from U.S. Provisional Application Ser. No. 61/430,034, filed Jan. 5, 2011, which is hereby incorporated by reference in its entirety.

All publications, patents, and patent applications cited in this Specification are hereby incorporated by reference in their entirety.

BACKGROUND

Water is vital to all living plants and animals, including humans. For human consumption, water treatment is often required because natural water is usually contaminated with a large number of dissolved, colloidal and suspended materials that may cause undesirable health effects. Some of them are relatively easy to be removed, while the others are more difficult. For example, suspended materials, such as silt, fine sand, and decaying biological solid matter, can be readily removed by physical separation processes such as filters and clarifiers. Dissolved materials are harder to be removed; their removal generally needs chemical precipitation, adsorption, ion-exchange, chemical oxidation, biological oxidation and assimilation, and membrane desalination. These processes tend to be very expensive.

Despite its high cost, removal of dissolved materials is technologically feasible. However, many of the removal technologies generate a large volume of waste streams such as sludge and brine, which represents a loss of valuable water. In addition, these waste streams require further treatment and disposal. For example, current reverse osmosis (RO) technology, which is a type of membrane desalination process, removes more than 99% of dissolved materials from contaminated water and produce purified water at a recovery rate of up to 80%, while producing a concentrate stream called brine.

One of the challenges facing membrane desalination is that dissolved and colloidal silica (silicon dioxide, $SiO_2$), which precipitates on the membrane surface, fouls the membrane, increases pressure across the membrane, and reduces the flow rate and water recovery. For example, at a recovery rate of 80%, concentrations of dissolved constituents in the brine stream from RO may be up to five times higher than those in the feed water. In this scenario, precipitation of silica may occur when silica concentration in the feed water is higher than 20 mg/L because silica has a solubility limit of about 100 mg/L.

Precipitation and solubilization of silica depend on a number of factors, including pH, temperature, and presence of other dissolved substances. Typical silica concentrations in natural water range from 5 to 25 mg/L, although concentrations near its saturation (>100 mg/L) occur in some areas (ASTM, 2010). Groundwater, urban and agricultural runoff, and wastewater usually contain more silica than surface water. Wells in volcanic and oil fields may contain up to 300 ppm of dissolved silica (Ning 2002). There are a number of processes that can remove silica from water. For example, aluminum sulfate (alum) can coagulate colloidal silica and anion exchange can remove anionic silicates. Activated alumina can also remove silica via adsorption. However, these processes are often ineffective or incomplete due to silica's complex chemistry and strict pH control, as well as the presence of interferences, such as competing anions including sulfate ($SO_4^{2-}$), bicarbonate ($HCO_3^-$) and chloride ($Cl^-$). In addition, these processes generate waste by-products, such as spent media, brine, and sludge, requiring proper disposal.

Thus, a need exists to develop a method and/or system to reduce the amount of silica and other contaminants in the source water prior to a desalination process to improve the efficiency thereof and to prolong the functional life of the filter used therein.

SUMMARY

Provided in one embodiment is a method of treating a source water, comprising: providing a source water containing an amount of silicon-containing molecules; and exposing the source water to a plurality of organisms, whereby the amount is reduced after the exposure.

Provided in alternative embodiment is a method of treating a source water, comprising: exposing a source water comprising an amount of silicon-containing molecules to a plurality of organisms, whereby the amount is reduced after the exposure; and desalinating the source water.

Provided in another embodiment is a method of desalination, comprising: subjecting a source water containing a first amount of silicon-containing molecules to a first desalination process, which generates a first fresh water product and a first brackish concentrate having a second amount of the silicon-containing molecules; exposing the concentrate to a plurality of biological organisms, which generates a treated brackish concentrate with a third amount of the silicon-containing molecules; and subjecting the treated brackish concentrate to a second desalination process, which generates a second fresh water product and a waste brine.

Another embodiment provides an apparatus, comprising: a container comprising: a source water containing an amount of silica, wherein the amount is between about 1 mg/L and about 120 mg/L; and a plurality of diatoms.

DETAILED DESCRIPTION

Figure 1:
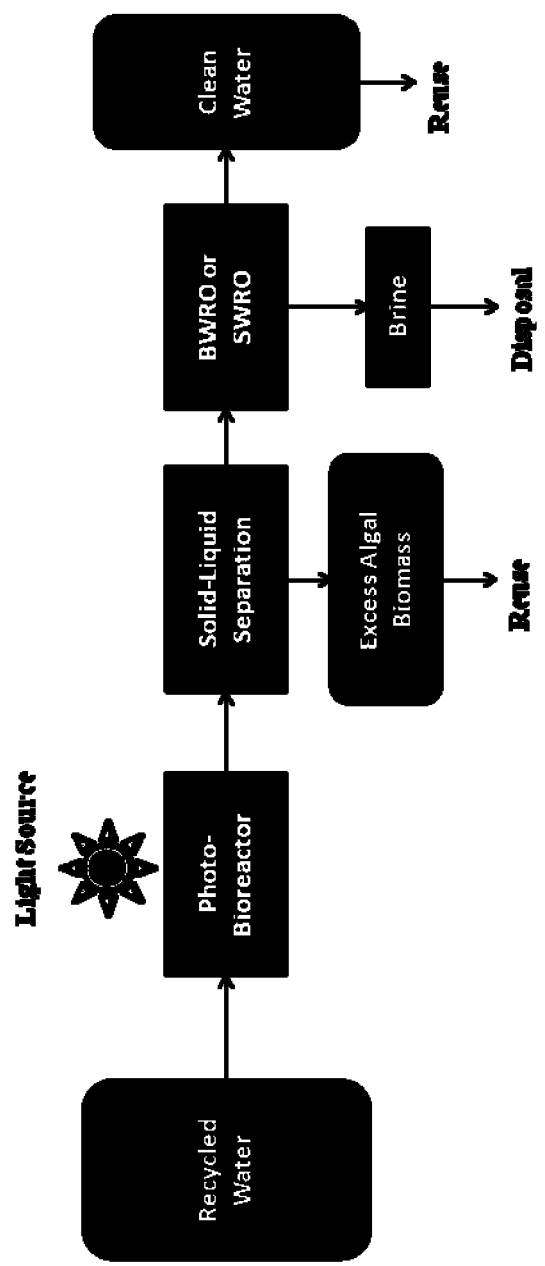
FIG. 1 illustrates an example of a flow-through photobioreactor set-up coupled with desalination in one embodiment.

Provided in one embodiment is photobiological processes and systems for the pretreatment of an aqueous medium contaminated with dissolved and/or colloidal substances, such as silica and/or silicates, using a biological organism, such as diatoms.

In one embodiment, an algae-based photobiological process can be used. For example, one embodiment provides a method of treating a source water, comprising: providing a source water containing an amount of silicon-containing molecules; and exposing the source water to a plurality of organisms, whereby the amount is reduced after the exposure.

Aqueous Medium

The aqueous medium can be any aqueous medium that undergoes a desalination process, such as a membrane filtration process and a thermal process. Thus, in some embodiments, the term "aqueous medium" can be considered as a source water used for another process, such as a biological process or filtration process. Accordingly, the terms "aqueous medium" and "source water" can be used interchangeably in some embodiments herein. In one embodiment, the source water can comprise natural water, such as surface water, ground water, agricultural runoffs, urban runoffs, domestic wastewater, industrial wastewater, seawater, brackish water, or combinations thereof.

The aqueous medium (or source water) to be treated by the presently described methods may contain contaminants that are desirably removed. The contaminants can be, for example, silicon-containing molecules. Other contaminants, such as toxic substances, such as arsenic, can also be present and removed. In some embodiments, "silicon," or any of the elements mentioned in the present disclosure refers to the silicon element (or any of the elements mentioned) found in the Periodic Table. Thus, a silicon-containing molecule can be in the form of a compound, a molecule, or a complex. For example, at least some of the silicon-containing molecules can be in the form of a silica, silicate, or a combination thereof. The molecule can be in the form of dissolved (ionic) species in the medium. Alternatively, the molecule can be in the form of a colloidal matter (suspension).

Silica is abundant in nature as sand and quartz and has a very complex chemistry in water. Silica is soluble in water at concentrations of up to 120 mg/L (Amirtharajah and O'Melia, 1990). Silica may also be present in water as a colloid, which is microscopic dispersion of matter. In water some of the dissolved silica becomes hydrated to silicic acid [$Si(OH)_4$] or silicates (e.g., $SiO_4^{4-}$). Silicic acid is a very weak acid with the first acid dissociation constant ($pK_{a1}$) of 9.81. Silicates may contain other metal oxides. Soluble silica may be monomeric or polymeric. Monomeric and some of the polymeric silica are known to be reactive toward molybdic acid, a common colorimetric reagent for dissolved silica determination and are often called "reactive silica." In several embodiments described herein, the term "silica" can refer to silica in a suspension/colloidal form or in a dissolved form. In other words, silica can refer to silica, silicic acid, silicate, etc., or any of the aforementioned silica form.

The silicon-containing molecules can be present in the source water in any concentration, depending on the source of the water, prior to the presently described treatment methods. For example, in one embodiment, the concentration can be between about 0.5 mg/L and about 150 mg/L, such as between about 1 mg/L and about 120 mg/L, such as about 10 mg/L and about 100 mg/L, such as about 20 mg/L and about 80 mg/L, such as about 40 mg/L and about 60 mg/L. Depending on the application, in some embodiments a source water high in silicon-containing molecules, such as greater than or equal to about 10 mg/L, such as greater than or equal to about 20 mg/L, such as greater than or equal to about 30 mg/L, can be used. Alternatively, in some embodiments a source water low in silicon-containing molecules, such as less than or equal to about 30 mg/L, such as less than or equal to about 20 mg/L, such as less than or equal to about 10 mg/L, such as less than or equal to about 5 mg/L can be used.

As a result of the presently described treatments, the concentration (or amount) of the silicon-containing molecules can be reduced to less than or equal to 1 mg/L, such as less than or equal to 0.5 mg/L, such as less than or equal to 0.2 mg/L, such as less than or equal to 0.1 mg/L, such as less than or equal to 0.05 mg/L. In some embodiments, the amount of silicon-containing molecules in the source water after the water undergoes the presently described treatment can be reduced to less than or equal to about 1/5, such as about 1/10, such as about 1/20, such as about 1/25, such as about 1/30, such as about 1/40, such as about 1/50, such as about 1/60, such as about 1/80, such as about 1/100, of that before undergoing the treatment.

Biological Organisms

The biological organisms used herein can be any biological organisms that can facilitate the removal of the contaminants. In one embodiment, the biological organism can be an algae. For example, the biological organisms can be diatoms.

Diatoms are a group of unicellular microalgae called bacillariophyta that can be found in both freshwater and seawater. They have a hard and porous cell wall called a frustule, which is composed mostly of silica. Because of their ability to utilize silicate, diatoms gain an advantage over other algal species in early spring and become dominant where silicate concentrations are >2 µM (56 µg/L as Si or 120 µg/L as $SiO_2$) (Egge and Aksnes, 1992). Recently, cultivation of various diatom species, such as *Phaeodactylum tricornutum*, has been attempted for fabricating nanometer-sized silica structures for semiconductor nanolithography and vehicles for drug delivery (Bradbury 2004).

Any brackish water or seawater diatom species may be used. Examples of diatom species that may be used include (but are not limited to) *Amphora* spp., *Asterionella* spp., *Cyclotella* spp., *Cylindrotheca* spp., *Encyonema* spp., *Fragilaria* spp., *Phaeodactylum* spp., and *Thalassiosira* spp.

A diatom inoculum may be obtained from natural water, such as surface water, using a phytoplankton net, from bottom sediments of a water body, or from a culture collection laboratory and other commercial/non-commercial sources. Either individual, known mixture, or unknown mixture of different diatom species, may be used. Algal species other than diatoms (such as green algae and yellow algae) as well as other micro- and macro-organisms, such as bacteria and aquatic plants, may also be used in combination with diatoms in the presently described methods and systems.

Although different diatoms can be used, it is preferable that the diatom used is adapted or tolerant to the salinity of aqueous medium to be treated. For example, a brackish water diatom can be used for the treatment of brackish (salinity=0.5 to 30 g/L) water, while a diatom from seawater can be used for the treatment of saline water (salinity=30 to 50 g/L). Additional different diatoms can be used for a salinity level that is higher or lower than the aforementioned ranges.

As described further below, the biological organisms used herein can be used and/or recycled. Alternatively, pure or mixed culture biomass may be harvested from these organisms as a beneficial by-product. Such biomass may be used in biofuel production and/or animal and fish feed.

Nutrients

To enhance the functions of the biological organisms, nutrients, such as macronutrients, micronutrients, or both can be used. The nutrients can already be present in the source water or in the reactor, such as a bioreactor, before the commencement of the biological process, or it can be added before or during the biological process. Some examples of macronutrients can comprise the element phosphorus, nitrogen, potassium, or a combination thereof. In one embodiment, the element phosphorus can be in the form of orthophosphate and/or polyphosphate. In another embodiment, the element nitrogen can be in the form of ammonia, ammonium, nitrate, nitrite, organic nitrogen (e.g., urea, proteins and amino acids), or combinations thereof. Examples of micronutrients, such as trace metals (e.g., zinc, cobalt, molybdenum, copper, and iron), vitamins (e.g., vitamins $B_1$ and $B_{12}$), or a combination thereof, may also be used.

An inorganic carbon source for photosynthesis, either in the form of dissolved carbon dioxide gas ($CO_2$), carbonate ($CO_3^{2-}$), bicarbonate ($HCO_3^-$), or combinations thereof, is preferably present in the aqueous medium to facilitate photosynthesis of the biological organism.

Other soluble and particulate water constituents may be present, including cations (e.g., $Na^+$, $K^+$, $Ca^{2+}$, $Mg^{2+}$, $Fe^{2+}$, $Fe^{3+}$, $Zn^{2+}$, $Cu^{2+}$, $Co^{2+}$, and $Mn^{2+}$), anions (e.g., $Cl^-$, $SO_4^{2-}$, $SeO_4^{2-}$, $Br^-$, and $F^-$), organics (e.g., humic substances and synthetic organic compounds), colloidal and suspended minerals, or combinations thereof. Concentrations of these constituents may be in the order of micromole per liter (µM) for trace elements to mole per liter (M) for sodium, chloride and sulfate.

Light can be a source of energy for diatoms to grow and maintain their cells, and thus light can be used to facilitate the presently described treatment processes. Light may be natural light, such as natural sunlight, or of artificial sources, such as fluorescent tubes, light emitting diodes (LEDs), and/or incandescent lamps. While continuous exposure to a light source is preferable, a very high light intensity may result in photo-inhibition. Illumination may be intermittent in batch and semi-batch reactors, while continuous illumination can be needed for continuous water treatment in some embodiments.

Photobioreactor

A photobioreactor may comprise an open or closed vessel, basin, or container and operated in either a batch, semi-batch or continuous mode. In one embodiment, the photobioreactor can be the vessel, basin, or container, in which the source water and biological organisms are present to undergo the biological process. In addition to constructed vessels and basins, a natural basin (e.g., a pond) may be used as a reactor. The aqueous medium in the reactor may be illuminated with a single or multiple light sources, such as lamps and sunlight. In one embodiment, such reactors may be referred to as photobioreactors.

Figure 7:
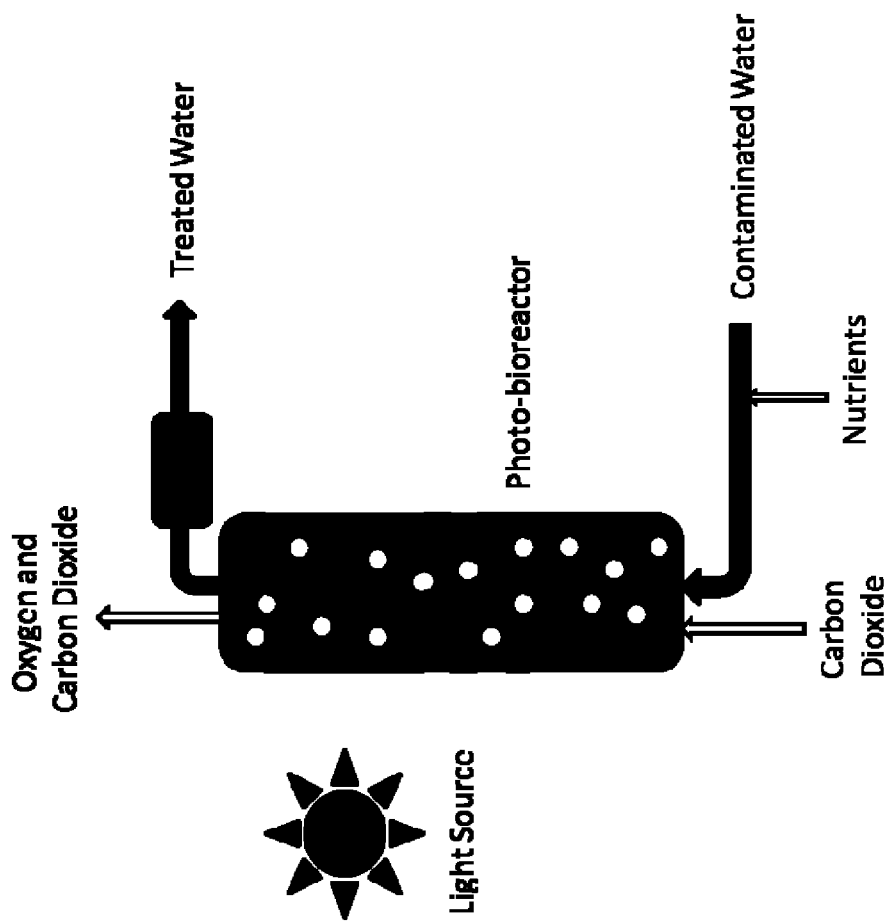
FIG. 7 illustrates an alternative example of flow-through photobioreactor set-ups.

FIG. 7 provides a schematic of the set-up of a flow-through photobioreactor in one embodiment. The aqueous medium containing silica (i.e., contaminated water) at a concentration up to 120 mg/L or saturation can be introduced from the bottom of the photobioreactor (from anywhere thereof, such as the bottom), either by gravity or by a booster pump. The reactor can be illuminated with at least one light source, such as sunlight and/or lamps. In order to enhance the growth of diatoms, carbon dioxide and at least one nutrient, such as phosphate, ammonia, or nitrate, may be added to the aqueous medium at a controlled rate. At the end of the reactor, a filter or screen may be placed to prevent the release of algal cells into effluent, as well as to retain a high concentration of cells in the reactor.

In one embodiment, an aqueous medium or source water can be fed into a flow-through photobioreactor containing a single or a mixture of live diatom species. The medium flows through the illuminated reactor where dissolved and colloidal silica is taken up by the diatoms along with nutrients. After a certain contact time, the resultant water exits from an outlet.

Alternatively, a photobioreactor may be operated in a batch or semi-batch mode. In one embodiment, the aqueous medium may be introduced into a vessel or basin with a live diatom species, incubated for a certain period of time with illumination, and withdrawn from the reactor with (in a batch mode) or without diatom biomass (in a semi-batch mode).

In one embodiment, a solid-liquid separation process is used at the downstream of a photobioreactor to separate algal biomass from treated aqueous medium. In an alternative embodiment, a flow-through and semi-batch photobioreactor, a device, such as a screen and a filter, can be installed at the outlet to prevent washout of algal cells. Alternatively, a device may be installed within the photobioreactor to retain the biomass inside while allowing treated aqueous medium to flow out. A device may also be installed to remove excess algal cells from the photobioreactor.

The pH range of the medium in the reactor can be kept generally at between about 7 and about 9. The temperature of the medium in the reactor can be kept generally at between about 15 and about 30° C., such as between about 16 and about 28° C., such as between about 20 and about 25° C. Mixing may be used to prevent short-circuiting and sedimentation of diatom cells, and to allow aeration of the aqueous medium to supply carbon dioxide. Salinity of the aqueous medium may vary from fresh (<0.5 g/L) to brackish (0.5 to 30 g/L) and saline (30 g/L to 50 g/L).

Along with silica, phosphorus, nitrogen, dissolved carbon dioxide, carbonate, and bicarbonate are removed in the photobioreactor. Biotic or abiotic oxidation and subsequent precipitation of other water constituents, such as reduced iron ($Fe^{2+}$) and manganese ($Mn^{2+}$), may occur simultaneously. In addition, physicochemical adsorption/precipitation and/or biological assimilation of other elements may also occur.

Figure 5:
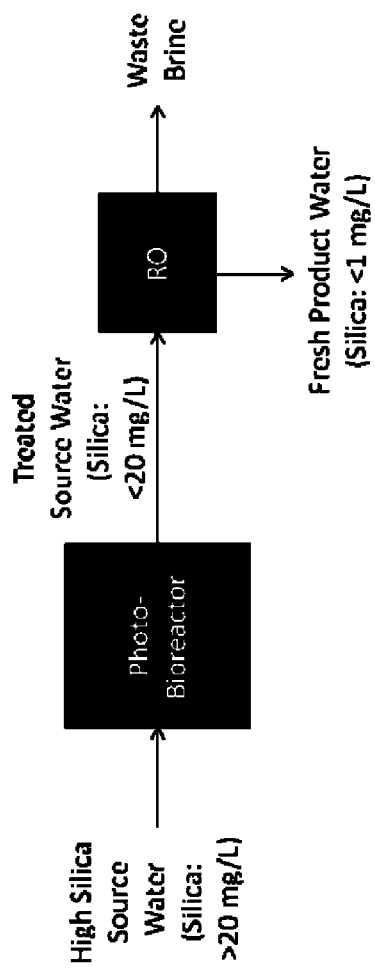
FIG. 5 illustrates a treatment scheme for desalination of high silica (>20 mg/L) source water using a photobioreactor followed by reverse osmosis ("RO") in one embodiment.
Figure 6:
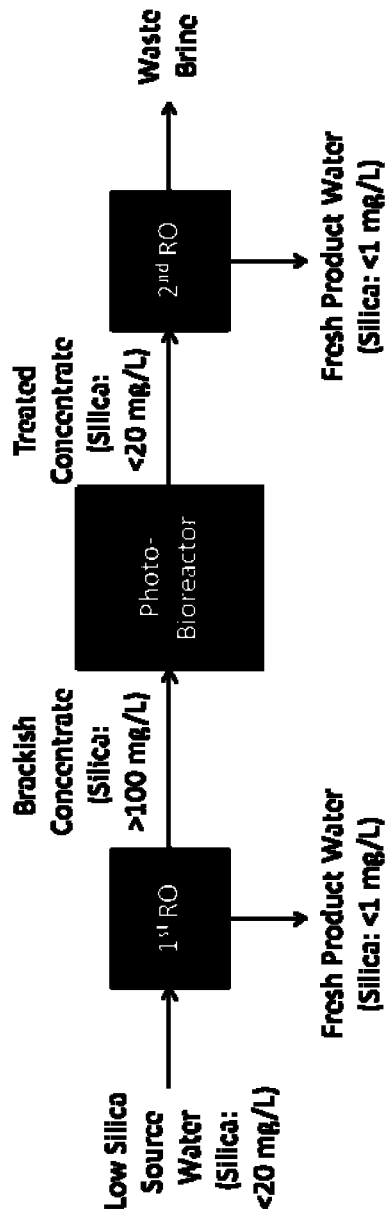
FIG. 6 illustrates a treatment scheme for desalination of low silica (<20 mg/L) source water using a first RO, followed by a photobioreactor and a second RO.

The photobiological apparatus/reactor described herein can be integrated with a desalination apparatus or system, as shown in FIGS. 1, 5, and 6. The photobiological reactor can be further integrated to be not just a part of a desalination system, but a part of a desalination plant.

FIG. 1 illustrates an example of a flow-through photobioreactor set-up coupled with desalination in one embodiment. The aqueous medium containing silica at a concentration up to 120 mg/L or saturation can be introduced to the photobioreactor, either by gravity or by a booster pump. The reactor is illuminated with a light source, such as sunlight and lamps. In order to enhance the growth of diatoms, carbon dioxide and nutrients, such as phosphate, ammonia, and nitrate, may be added to the aqueous medium at a controlled rate. At the end of the reactor, a filter or screen will be placed to prevent the release of algal cells into effluent, as well as to retain a high concentration of cells in the reactor.

Effluent from the photobioreactor shall contain less silica, nutrients, dissolved carbon dioxide, and carbonate/bicarbonate, while it may contain more dissolved oxygen and organic carbons. The concentration of silica (or silicates) may be reduced to below 1 µM or 60 µg/L (Egge and Aksnes, 1992). Biotic or abiotic oxidation and subsequent precipitation of other water constituents, such as reduced iron ($Fe^{2+}$) and manganese ($Mn^{2+}$), may occur simultaneously. In addition, physicochemical adsorption or biological assimilation of trace elements may also occur.

The effluent from the photobioreactor may be introduced to desalination process, such as brackish water reverse osmosis, seawater reverse osmosis, and distillation. A solid-liquid separation process, such as clarifier, dissolved air flotation (DAF), and filtration, may be placed between the photobioreactor and desalination process. Excess algal biomass may be withdrawn periodically from the photobioreactor. The biomass may be dewatered, sold and used in various applications, such as animal feed and biofuel production.

FIG. 5 illustrates a conceptual treatment scheme for desalination of high level of silica (>20 mg/L) source water using a photobioreactor followed by RO.

FIG. 6 illustrates a conceptual treatment scheme for desalination of low level of silica (<20 mg/L) source water using the first RO, followed by a photobioreactor and the second RO.

Photobiological Process

The presently described methods and systems utilize a biological process to remove aqueous dissolved and colloidal constituents, such as silica or silicate and phosphate, which would otherwise precipitate and/or foul membranes in a desalination process or cause mechanical damages to elements in a process using heated water and steams. In one embodiment, the photobiological process can utilize a single or a mixture of algae called diatoms (also known as Bacillariophyta) with one or more light sources. When used as a pre-treatment, this method will improve the efficiency of desalination processes, mineral removal filters, and thermal processes, such as heat exchangers, heaters and boilers.

One embodiment utilizes an algal process involving diatoms to remove silica or silicate present in an aqueous medium with various salinity (i.e., freshwater, brackish water, saline water, and brine) and compositions. Such an aqueous medium may be obtained from various sources, such as surface water, groundwater, agricultural and urban runoffs, domestic and industrial wastewater, and seawater. An aqueous medium may be treated by this algal process with or without pretreatment, such as filtration and disinfection.

The diatom-based photobiological process in one embodiment may be used to reduce the scaling potential and to enhance the recovery of product water in a desalination system by removing silica from the aqueous medium. Such a photobioreactor may be used for pre-treatment of high-silica (>20 mg/L) source water before desalination, as well as for treatment of concentrate from the primary desalination process before recycling in the secondary desalination process. Effluent from the photobioreactor may be fed into subsequent desalination process with or without post-treatment, such as filtration and disinfection.

In addition, this process may be used as a pre-treatment for arsenic removal by metal oxide/hydroxide media, oil and gas field well water treatment, as well as for the treatment of cooling tower, heat exchangers and boiler feed water, where excessive silica scaling may foul the equipment and cause serious mechanical problems.

In one embodiment, a diatom-based photobioreactor can be used to pretreat an aqueous medium or source water prior to a desalination process. The aqueous medium containing as much as 120 mg/L of dissolved and/or colloidal silica can be impounded in a tank or reservoir, or directly fed into the treatment system. If needed, appropriate pretreatment, such as suspended solids removal, equalization, pH adjustment, pre-oxidation, and disinfection can be done prior to this algal treatment. As aforedescribed, an appropriate amount of nutrients can be added to improve the function of the diatoms. Alternatively, in the case where the source water already contains a sufficient amount of nutrients, the addition of nutrients is not needed.

A solid-liquid separation process is to be used at the downstream end of a photobioreactor to separate algal biomass from treated aqueous medium. The separation process can be by physical (e.g., by filter) or chemical (e.g., chemical reactions) separation. The separation process can be carried out during any stage of the pretreatment and need not be at the end. Separated biomass may be recycled back to the photobioreactor or may be wasted. Alternatively, a biomass-retaining device may be incorporated in the photobioreactor to prevent washout of biomass while allowing treated aqueous medium to flow out. The resultant water can be fed into a desalination process with or without post-treatment, such as filtration and disinfection.

The treated aqueous medium contains less dissolved and colloidal silica. Along with silica, phosphorus, nitrogen, dissolved carbon dioxide, carbonate, and bicarbonate are removed in the photobioreactor. Biotic or abiotic oxidation and subsequent precipitation of other water constituents, such as reduced iron and manganese, may occur simultaneously. In addition, physicochemical adsorption/precipitation and/or biological assimilation of other elements may also occur. In some embodiments, effluent from the photobioreactor after the exposure to the diatoms may contain more dissolved oxygen and organic carbons than before the exposure/treatment.

Examples of Application in Desalination

As aforedescribed, the photobiological processes described herein can be used as a treatment of a source water or can be used as a pretreatment of a source water before the water is subjected to a subsequent desalination process. Thus, as aforementioned, the process can be an integral part of a desalination plant. Any desalination process known (e.g., reverse osmosis, forward osmosis, vibratory sear enhanced processing (VSEP) RO, seawater RO, or thermal distillation, etc, or combinations thereof) can be used subsequent to the presently described photobiological process. For example, in one embodiment, the exposure of the source water to the photobiological processes described herein can reduce the amount of the contaminants, such as silicon-containing molecules, in the source water. Other contaminants, such as toxic substances, including arsenic, can be removed as well. The reduction in the contaminants can improve the efficiency of the desalination as aforementioned. Thus, any portions of the biological processes described herein can be performed once or can be repeated multiple times, depending on the need.

In one embodiment, the presently described diatom-based photobiological process may be used to reduce the scaling potential and to enhance the recovery of product water in a desalination system. A photobioreactor may be used for pre-treatment of high-silica (>20 mg/L) source water before desalination (FIG. 5), as well as for treatment of concentrate from the primary desalination process before recycling in the secondary desalination process (FIG. 6).

In one embodiment, the photobiological process can be used as pre-treatment of high-silica source water (>20 mg/L) for a desalination process, such as RO. Some points of note for one embodiment include (i) product water recovery may be increased because the membrane scaling potential will be lower; (ii) nutrient addition may or may not be needed; (iii) the second photobioreactor and desalination process may be added to recover more product water.

In another embodiment, the photobiological process can be used as treatment of the concentrate stream from a desalination process of low-silica source water, which concentrate stream can contain an elevated level of silica. The low-silica source water can have silica at ≤20 mg/L, such as ≤10 mg/L, such as ≤5 mg/L, such as ≤2 mg/L. On the other hand, the elevated silica level can be, for example ≥40 mg/L, such as ≥60 mg/L, such as ≥80 mg/L, such as ≥100 ml/L. Some points of note for one embodiment include (i) treated concentrate may be further processed by a second desalination process, such as vibratory sear enhanced processing (VSEP) RO, seawater RO, or thermal distillation, to recover more product water from the concentrate; (ii) membrane scaling potential in the concentrate will be reduced because of the lower silica concentration; (iii) nutrient addition may not be required because nutrients in the source water are concentrated by the first RO.

The presently described photobiological process has the surprising benefit of improvement in desalination efficiency and extension of media filtration life by reduction in scaling. The photobiological processes (or "biological processes" for short in some embodiment) may further produce algal biomass as a by-product that may be used for beneficial applications, such as in biofuel production and/or animal and fish feed.

FIG. 5 provides a schematic illustration of such a set-up. As a result of the combination of the presently described photobiological process and the desalination process, the amount of the contaminant in the water product can be reduced to only a small fraction of the original amount—e.g., less than or equal to about 1/5, such as about 1/10, such as about 1/20, such as about 1/25, such as about 1/30, such as about 1/40, such as about 1/50, such as about 1/60, such as about 1/80, such as about 1/100. In one embodiment, the source water can contain a high amount of silica (e.g., >20 mg/L), and as a result of the photobiological treatment the amount of the silica can be reduced to below 20 mg/L. With the desalination process, the amount of the silica can be further reduced such that the fresh water product can contain silica less than 1 mg/L. The waste brine by product can be discarded or can be further recycled, if needed—if the latter, then the photobiological process and/or the desalination process can be repeated.

The photobiological process described herein need not always be performed prior to the desalination process. In some embodiments, depending on the need the process can be performed before, after, or both, a desalination process. FIG. 6 provides one illustrative embodiment. In one embodiment, the photobiological process can be used both to pre-treat the source water prior to the desalination and to treat the concentrated brackish water (as a side product of the desalination) to facilitate the recycling of the brackish water. Any of the desalination process known can be used.

In one embodiment, a method of desalination can include subjecting a source water containing a first amount of silicon-containing molecules to a first desalination process, which generates a first fresh water product and a first brackish concentrate having a second amount of the silicon-containing molecules; exposing the concentrate to a plurality of biological organisms, which generates a treated brackish concentrate with a third amount of the silicon-containing molecules; and subjecting the treated brackish concentrate to a second desalination process, which generates a second fresh water product and a waste brine. In one embodiment, the source water can contain a high level of silica or it can contain a low level of silica. For example, as shown in FIG. 6, the silica amount in the source water can be less than 20 mg/L—other amount, such as ≤40 mg/L, such as ≤30 mg/L, such as ≤20 mg/L, such as ≤10 mg/L can be used. In the case of a low silica level (as in this case, for example), the source water can be subjected to a desalination process directly, which can produce a fresh water product (e.g., with less than 1 mg/L of silica).

The brackish concentrate, which often contain a heightened amount of silica (e.g., ≥60 mg/L), produced as a byproduct/waste of the desalination process, can be recycled by undergoing the aforedescribed photobiological and/or desalination processes. As shown in FIG. 6, the concentrate can undergo a photobiological process in a photobioreactor and the treated concentrate can then have a reduced amount of silica (e.g., ≤20 mg/L), which then can be subjected to another desalination process. If need arises, the sequence can be repeated to keep recycling byproducts of a desalination process.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

NON-LIMITING WORKING EXAMPLES

Example 1

In one experiment, a brackish source water containing about 39 mg/L of silica was successfully treated by 500-mL photobioreactors in a bench-scale semi-batch mode. Approximately 500 mL of silica-rich (source) water was placed in clear polyethylene terephthalate (PETE) bottles. The water was inoculated with pre-cultured diatoms. The inoculated bottles—each bottle was considered a photobioreactor—were incubated at 26° C. and were illuminated continuously with fluorescent lights. The water initially contained 32 and 2.2 mg/L of nitrate-N and orthophosphate, respectively. Aliquots of sample were withdrawn periodically from the bottles and were tested for silica and orthophosphate. Once silica concentration was reduced to below 0.8 mg/L, water was removed by decantation while the majority of algal biomass was kept in the bottles. Fresh silica-rich water was added to the bottles, and the above procedure was repeated several times without adding a new inoculum.

Figure 2:
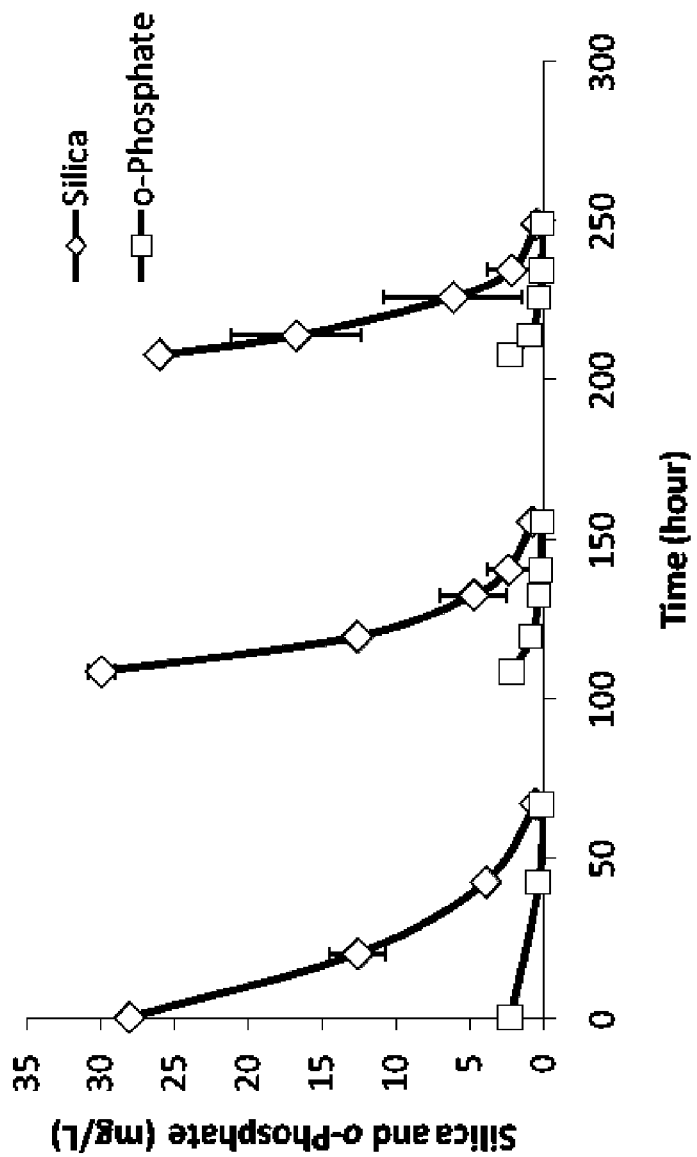
FIG. 2 shows the results from a bench-scale semi-batch silica and phosphate removal in one embodiment.
Figure 3:
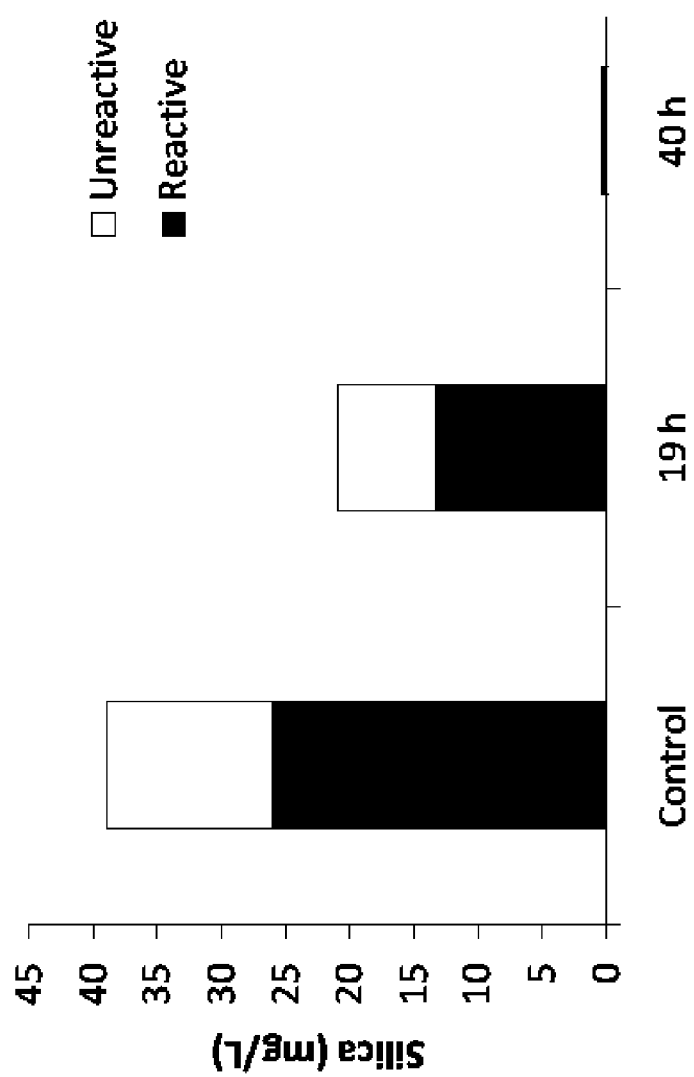
FIG. 3 shows the results of the removal of both molybdate reactive (i.e., monomeric and oligomeric) and molybdate unreactive (i.e., polymeric) silica in one embodiment.

The temperature was set at about 26° C. The initial pH was 8.6. The results of the silica and phosphate removal from this experimental are shown in FIG. 2. It was found that for every run of the photobioreactor, the levels of the silica and phosphate were reduced to below 0.8 mg/L, even after the diatoms were reused multiple times. FIG. 3 shows the removal of both molybdate reactive (i.e., monomeric and oligomeric) and molybdate unreactive (i.e., polymeric) silica. Within two days, the concentrations of both reactive and unreactive silica were reduced to below 0.5 mg/L (see FIG. 3). Other water constituents, including calcium, magnesium, bicarbonate, nitrate-N, orthophosphate, total hardness, and alkalinity were reduced by 34%, 25%, 26%, 17%, 96%, 12%, and 26%, respectively (Table 1).

TABLE 1

Water quality parameters before and after the diatom-based photobiological treatment.

|  | Raw Water | Treated Water |
| --- | --- | --- |
| Cations |  |  |
| Sodium (mg/L) | 2,895 | 2,905 |
| Potassium (mg/L) | 32 | 28 |
| Calcium (mg/L) | 232 | 152 |
| Magnesium (mg/L) | 248 | 250 |
| Iron (µg/L) | 20 | 20 |
| Manganese (µg/L) | 85 | 64 |

TABLE 1-continued

Water quality parameters before and after the diatom-based photobiological treatment.

|  | Raw Water | Treated Water |
| --- | --- | --- |
| Anions |  |  |
| Chloride (mg/L) | 2,480 | 2,490 |
| Sulfate (mg/L) | 4,150 | 3,975 |
| Bicarbonate (mg/L) | 275 | 204 |
| Nitrate-N (mg/L as N) | 37 | 30 |
| Total Silica (mg/L) | 39 | 0.14 |
| Reactive Silica (mg/L) | 30 | 0.3 |
| Orthophosphate (mg/L) | 2.30 | 0.09 |
| General Parameters |  |  |
| Total Dissolved Solids (mg/L) | 10,380 | 10,036 |
| Total Hardness (mg/L as CaCO$_3$) | 1,600 | 1,410 |
| Alkalinity (mg/L as CaCO$_3$) | 450 | 335 |
| Chemical Oxygen Demand (mg/L) | 92 | 90 |
| pH | 8.6 | 9.2 |
| Color at 455 nm (PtCo Color Unit) | 31 | 39 |

Example 2

In one experiment, a brackish source water containing about 30 mg/L of reactive silica was successfully treated by an 8-L photobioreactor in a semi-batch mode. Approximately 4 L of silica-rich water was placed in an 8-L high density polyethylene (HDPE) container without a lid. The water was inoculated with pre-cultured diatoms. The inoculated container was loosely covered with a clear plastic wrap, incubated at 27.5° C. with continuous illumination with fluorescent tubes. The water initially contained 32 and 2.2 mg/L of nitrate-N and orthophosphate, respectively. Aliquots of sample were withdrawn periodically from the container and were tested for silica and orthophosphate. Once silica concentration was reduced to below 0.8 mg/L, water was removed by decantation while the majority of algal biomass was kept in the container. Fresh silica-rich water was added to the container, and the above procedure was repeated several times without adding a new inoculum.

Figure 4:
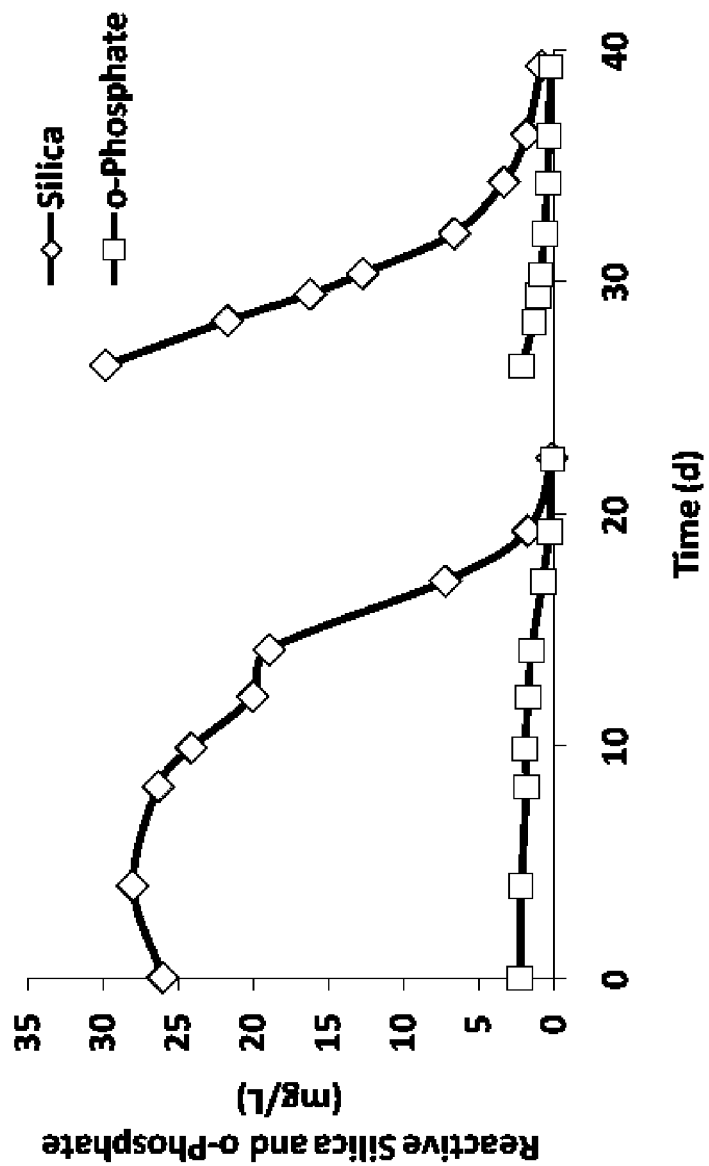
FIG. 4 illustrates the results from another bench-scale semi-batch silica and phosphate removal in another embodiment.

The temperature was about 27.5° C. The initial pH was 8.6. In the first run, after about 10 days of lag period, reactive silica and orthophosphate were consumed very rapidly. Within about two weeks, the reactive silica concentration was reduced to below 0.5 mg/L. The treatment could be repeated several times without adding a new diatom inoculum. FIG. 4 illustrates the results from this experiment. Note only the first two runs are shown in FIG. 4. It was found that for every run of the photobioreactor, the levels of the silica and orthophosphate were reduced to below 0.8 mg/L, even after the diatoms were reused multiple times.

REFERENCES

1. Amirtharajah, A. and O'Melia, C. H. (1990) Coagulation processes: Destabilization, Mixing, and Flocculation. In *Water Quality and Treatment*, 4$^{th}$ Edition, American Water Works Association, McGraw-Hill, Inc., pp. 269-365.
2. ASTM (2010) *Standard Test Method for Silica in Water*, ASTM D859-10. Jun. 15, 2010.
3. Bradbury, J. (2004) Nature's nanotechnologists: Unveiling the secret of diatoms. *PLoS Biology* 2(10): e306.
4. Egge, J. K. and Aksnes, D. L. (1992) Silicate as regulating nutrient in phytoplankton competition. *Marine Ecology Progress Series* 83: 281-289.
5. Greene, B., McPherson, R. A., Darnal, D. W., and Gardea-Torresdey, J. L. (1991) Removal of metal ions with immobilized metal ion-binding microorganisms. U.S. Pat. No. 5,055,402.
6. Ning, R. Y. (2002) Discussion of silica speciation, fouling, control and maximum reduction. *Desalination* 151: 67-73.

What is claimed:

1. A method of desalination, comprising:
   subjecting a source water containing a first amount of silicon-containing molecules to a first desalination process, which generates a first fresh water product and a first brackish concentrate having a second amount of the silicon-containing molecules;
   exposing the concentrate to a plurality of biological organisms, which generates a treated brackish concentrate with a third amount of the silicon-containing molecules; and
   subjecting the treated brackish concentrate to a second desalination process, which generates a second fresh water product and a waste brine.

2. The method of claim 1, wherein the first amount is less than or equal to about 20 mg/L.

3. The method of claim 1, wherein the second amount is greater than or equal to about 60 mg/L.

4. The method of claim 1, wherein the third amount is less than or equal to about 20 mg/L.

5. The method of claim 1, wherein at least one of the first and the second desalination processes involves reverse osmosis, forward osmosis, vibratory sear enhanced processing (VSEP) RO, seawater RO, thermal distillation, or combinations thereof.

* * * * *